United States Patent
Zilavy

(10) Patent No.: US 7,739,438 B2
(45) Date of Patent: Jun. 15, 2010

(54) METHOD FOR PRIORITY-ENCODING INTERRUPTS AND VECTORING TO INTERRUPT CODE

(75) Inventor: Daniel V. Zilavy, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1504 days.

(21) Appl. No.: 10/365,364

(22) Filed: Feb. 12, 2003

(65) Prior Publication Data

US 2004/0158664 A1 Aug. 12, 2004

(51) Int. Cl.
- G06F 13/24 (2006.01)
- G06F 13/26 (2006.01)
- G06F 13/32 (2006.01)

(52) U.S. Cl. .......... 710/269; 710/260; 710/264

(58) Field of Classification Search ......... 710/240–244, 710/260–269
See application file for complete search history.

(56) References Cited

U.S. PATENT DOCUMENTS

| | | | | |
|---|---|---|---|---|
| 5,511,200 A * | 4/1996 | Jayakumar | ......... | 710/266 |
| 5,724,599 A * | 3/1998 | Balmer et al. | ......... | 712/43 |
| 5,968,159 A * | 10/1999 | Mattheis | ......... | 710/264 |
| 6,205,509 B1 * | 3/2001 | Platko et al. | ......... | 710/269 |
| 6,298,410 B1 * | 10/2001 | Jayakumar et al. | ......... | 710/266 |
| 6,694,398 B1 * | 2/2004 | Zhao et al. | ......... | 710/260 |
| 6,754,754 B1 * | 6/2004 | Quach et al. | ......... | 710/260 |
| 6,845,419 B1 * | 1/2005 | Moyer | ......... | 710/264 |
| 7,054,974 B2 * | 5/2006 | Quach et al. | ......... | 710/260 |
| 7,143,219 B1 * | 11/2006 | Chaudhari et al. | ......... | 710/111 |
| 7,506,091 B2 * | 3/2009 | Kershaw et al. | ......... | 710/266 |
| 2003/0204655 A1 * | 10/2003 | Schmisseur et al. | ......... | 710/260 |
| 2004/0143692 A1 * | 7/2004 | Pezzini | ......... | 710/260 |
| 2004/0177192 A1 * | 9/2004 | Pezzini | ......... | 710/260 |
| 2005/0102460 A1 * | 5/2005 | Wahler | ......... | 710/269 |

FOREIGN PATENT DOCUMENTS

EP 001063588 A1 * 12/2000

OTHER PUBLICATIONS

High Speed External Interrupt Handler for Real Time System, IBM Technical Disclosure Bulletin, Sep. 1992.*

* cited by examiner

Primary Examiner—Ryan M Stiglic

(57) ABSTRACT

A method for interrupt priority encoding and vectoring begins with reading pending interrupt bits from an interrupt status register. An entry in a table is located using the pending interrupt bits. The table has a plurality of vector entries for at least one high priority interrupt bit, and a single entry for at least one low priority interrupt bit. A vector address is fetched from the table and a branch is performed to the vector address. An alternate embodiment has high and low priority interrupt vector tables, where the high low priority interrupt vector table is used if no high priority interrupt is present.

11 Claims, 2 Drawing Sheets

METHOD FOR PRIORITY-ENCODING INTERRUPTS AND VECTORING TO INTERRUPT CODE

The present invention relates to implementation of fast branching in computer systems. In particular, the present invention relates to table-driven, priority-encoded, fast vectoring suitable for software and hardware interrupt functions in computer systems.

BACKGROUND OF THE INVENTION

A priority-interrupt system is found in most modern computer systems. These may be implemented in hardware, software, or in a combination of hardware and software. These priority-interrupt systems can respond to externally or internally generated events, operating system calls, or other trigger events in a system.

Typically, a priority-interrupt system has multiple input signals. These signals may come from a variety of internal and external sources. When a trigger event occurs, a processor of the system executes a code segment associated with an active signal of the input signals. The time required from activation of an interrupt input signal to execution of a code segment associated with that input is known as interrupt latency.

There are generally multiple code segments available for execution, each may be located through a pointer known as an interrupt vector. Each code segment is associated with a particular signal of the input signals. The process of branching to code at interrupt vectors is known as vectoring.

Since input signals generally relate to system functions that can occur at different rates, it is generally desirable to prioritize the input signals. Priority interrupt systems prioritize the input signals such that, when multiple input signals occur, the code segment first executed is associated with the highest priority active input, while code segments associated with lower priority inputs may execute later. This is typically done by passing the input signals through a priority encoder to generate an interrupt vector associated with the highest priority active signal present at the time.

Priority encoders of hardware and software construction are known. Computer hardware often has special instructions provided for use in software priority encoders; for example there may be an instruction that generates a binary number corresponding with the most significant active bit of a word. Many microcontrollers, including those of the Intel 8096 family, provide hardware priority encoders for mapping signals to interrupt vectors.

Hardware priority encoders typically embody a fixed priority scheme. With these encoders, prioritization of interrupts is performed according to an integrated circuit designer's best guess, at the time a processor integrated circuit is designed, of appropriate priority for each interrupt input. Modern microcontroller integrated circuits are, however, often used in applications very different from those contemplated at the time the integrated circuit is designed. For example, the Intel 8061, parent of the Intel 8096/80196/80296 and Ford EEC-4 processor families, was developed to control a gasoline engine. Members of this processor family have been used in hundreds of products ranging from automatic transmissions, active suspensions, missile autopilots, printers, and disk drives to microwave ovens; the original integrated circuit designer's priority assignments are not optimum for all systems.

Other computer systems and microcontrollers are known where multiple input signals are brought to an interrupt status register, but where hardware encoding is not provided, or is provided over fewer input signals than required in a particular system. This may occur, for example, where interrupt sources not contemplated by the original integrated circuit designers are present in a system.

In either event, it is desirable to prioritize interrupts and generate vectors in software or firmware. Since large numbers of interrupts occur in typical microcontroller and computer systems, it is important that the overhead steps of encoding multiple inputs into interrupt vectors be performed quickly.

SUMMARY

A low latency, highly flexible, interrupt priority encoder for operation on a digital computer or microcontroller operates by reading an interrupt register. The register contents are used as an index to a table of interrupt vectors, from which an interrupt vector is read. The interrupt vectors are placed into the table in a pattern corresponding to the desired ordering of interrupt priorities. The interrupt encoder can be implemented in software, hardware, or a combination thereof.

In an alternative embodiment, the interrupt priority encoder operates by reading an interrupt register, and breaking the register contents into several fields. A first field, having high priority interrupts, is encoded as previously described. If no high priority interrupt is found, a "null vector" routine is executed whereby a second field, having lower priority interrupts, is encoded in similar fashion. If no lower priority interrupt is found, the process may be repeated for still lower priority interrupts.

DETAILED DESCRIPTION OF THE EMBODIMENTS

Figure 1:
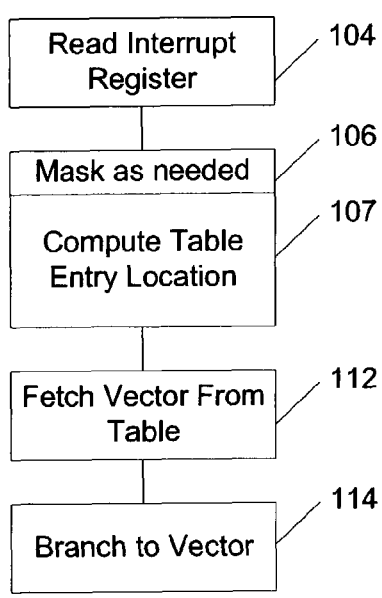
FIG. 1 is a flow chart of an interrupt priority encoder.
Figure 2:
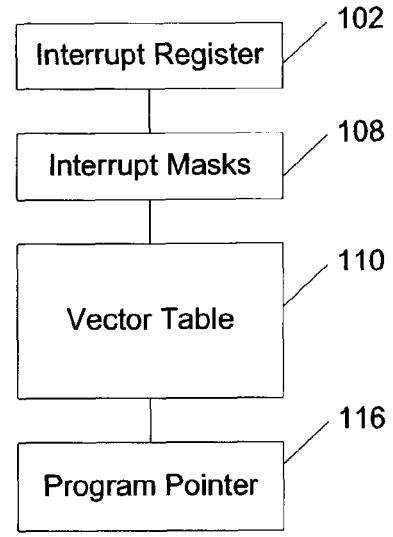
FIG. 2, a block diagram of the interrupt priority encoder.

With reference to FIGS. 1 and 2, an interrupt processing routine incorporating an interrupt encoder is activated upon occurrence of a triggering event, such as an interrupt-pending bit becoming set in an interrupt status register 102. The interrupt status register 102 is read 104, and any required masking operation performed 106 with interrupt mask registers 108. The masked bit pattern is then used to compute an address 107 in an interrupt vector table 110. On an eight-bit microcontroller having sixteen-bit addresses, computing the address 107 is done by left shifting the bit pattern by one bit and adding the base address of the table.

A vector is fetched 112 from vector table 110, and used as a destination address in a branch-to-vector operation 114. The branch to vector operation 114 results in loading the vector into a program pointer 116 of the processor. The steps of computing the vector address 107, fetching the vector 112, and branching to the vector 114 may be accomplished with one or several instructions as required by the instruction set of the processor.

Figure 3:
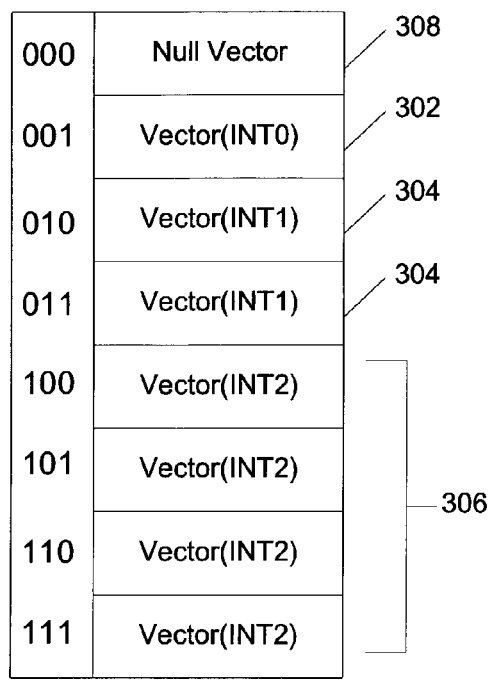
FIG. 3, an illustration of an interrupt vector table for use with the priority encoder.

An interrupt vector table (FIG. 3), for use with the priority encoder of FIGS. 1 and 2, is addressed by the pattern of interrupt-pending bits read from the interrupt status register and contains one or more interrupt vectors 302, 304, 306 corresponding to each interrupt-pending bit in the interrupt status register. The interrupt vector table has one vector 302 corresponding to the lowest priority interrupt, and twice that many vectors 304 for the next higher priority interrupt, with twice again that many vectors 306 for an even higher priority interrupt. The vector table has a number of locations equal to two raised to the power of the number of interrupts. There is also a vector 308 corresponding to the case where no interrupts are pending. While three interrupts are illustrated, it is anticipated that the priority encoder may have a greater number of inputs.

Figure 4:
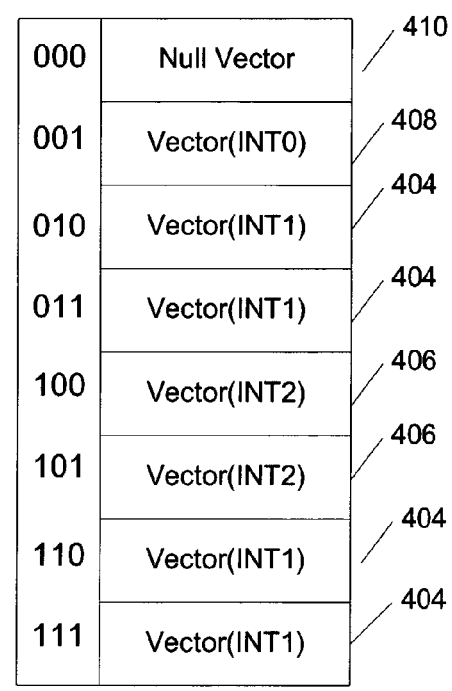
FIG. 4, an illustration of an interrupt vector table having non-sequential priority assignments.

An alternate embodiment of the priority encoder implements priority assignments such that more significant bits of the interrupt status register are not necessarily higher priority interrupts. These non-sequential priority assignments may be accomplished by reordering table contents in a manner resembling the vector table of FIG. 4. In the illustrated example, the middle interrupt INT1 has priority over INT2, which has priority over INT0. Half the table entries are vectors 404 corresponding to the case where INT1 is pending. Half the remaining vectors 406 correspond to INT2 being active. Remaining vectors correspond to a vector 408 where INT0 is pending, and a vector 410 for the case where no interrupt is pending.

Figure 5:
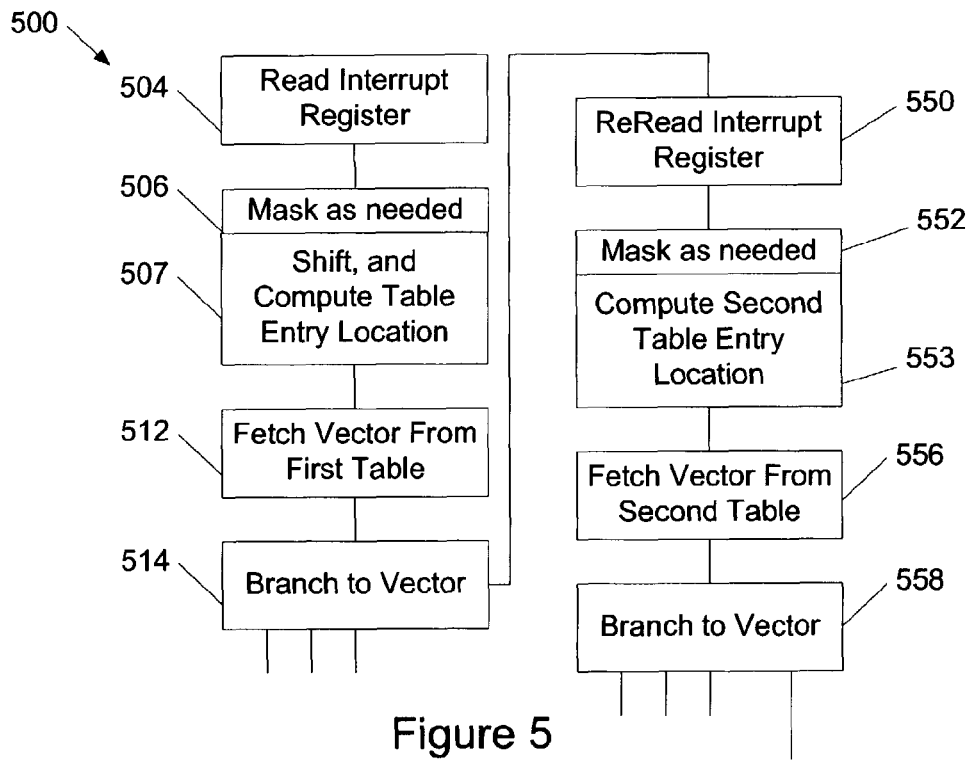
FIG. 5, a flow chart of a multistage interrupt priority encoder.

A multistage interrupt priority encoder 500 (FIG. 5) also begins by reading the interrupt status register 504, and any required masking operation is performed 506. The masked interrupt-pending bit pattern is then shifted such that selected high priority interrupt-pending bits remain, with lower priority interrupt-pending bits deleted, and used to compute an address 507 in a first interrupt vector table. In a particular embodiment, the effect of shifting is performed by selecting a high priority byte of the interrupt-pending register while ignoring lower bytes of the register. A vector is fetched 512 from the first vector table, and used as a destination address in a branch-to-vector operation 514.

If any high priority interrupts are pending, this process results in branching to code associated with the high priority interrupts. If no high priority interrupts are pending, a branch to the null vector, such as null vector 410 (FIG. 4), occurs. The null vector of the first interrupt vector table causes execution of code to prioritize the lower-priority interrupt-pending bits that were deleted at the mask, shift, and compute step 506.

These lower-priority interrupt-pending bits may be read from temporary storage, or the interrupt pending register may be reread 550 and any required masking operations repeated 552. In this pass, any pending high-priority interrupts are masked off, and an address in a second interrupt vector table is computed 553. An appropriate vector is read 556 from the second interrupt vector table, and a branch to that interrupt vector occurs 558. The null vector of the second interrupt vector table may cause execution of code to prioritize even lower-priority interrupt-pending bits, or may cause a return from the interrupt processing routine.

In an alternative embodiment, a test for zero is performed after low priority interrupt bits are deleted at the mask, shift, and compute step 506. If no high-priority pending interrupt bit is found, this embodiment branches directly to code for processing the lower-priority interrupt-pending bits at 550.

In yet another alternative embodiment, each interrupt vector table has an index to a third table having the actual vector locations. This alternative embodiment has advantage in that fewer bits are required to represent each vector in each vector table but may require additional processor time to determine each branch target.

A computer program product is any machine-readable media, such as an EPROM, ROM, RAM, DRAM, disk memory, or tape, having recorded on it computer readable code that, when read by and executed on a computer, instructs that computer to perform a particular function or sequence of functions. A microcontroller system having memory, the memory containing code for executing the heretofore described method for priority encoding and vectoring to interrupts, is a computer program product.

While the forgoing has been particularly shown and described with reference to particular embodiments thereof, it will be understood by those skilled in the art that various other changes in the form and details may be made without departing from the spirit and hereof. It is to be understood that various changes may be made in adapting the description to different embodiments without departing from the broader concepts disclosed herein and comprehended by the claims that follow:

What is claimed is:

1. A method for priority encoding and vectoring of interrupts comprising:

reading, in a computer, interrupt bits from an interrupt status register, wherein the interrupt bits comprise at least a high priority interrupt bit and a low priority interrupt bit;

computing, in the computer, an address of one of a plurality of entries in a table from the interrupt bits, wherein at least two of the entries is associated with the high priority interrupt bit, and a single one of the entries is associated with the low priority interrupt bit, wherein each of the entries comprises an interrupt vector;

fetching, in the computer, one of the interrupt vectors from the table based on the address; and branching, in the computer, according to the fetched interrupt vector.

2. A method for priority encoding and vectoring comprising:

reading, in a computer, interrupt bits from an interrupt status register, wherein the interrupt bits comprise a plurality of high priority interrupt bits and a plurality of low priority interrupt bits;

computing, in the computer, a first address of one of a plurality of entries in a high priority interrupt table from the plurality of high priority interrupt bits, wherein at least two of the entries of the high priority interrupt table are associated with a higher priority interrupt bit of the high priority interrupt bits, and a single one of the entries of the high priority interrupt table is associated with a lower priority interrupt bit of the high priority interrupt bits, wherein each of the entries of the high priority interrupt table comprises an interrupt vector;

fetching, in the computer, one of the interrupt vectors from the high priority interrupt table based on the first address; and branching, in the computer, according to the fetched interrupt vector from the high priority interrupt table.

3. The method of claim 2, further comprising the steps of:

computing a second address of one of a plurality of entries in a low priority interrupt table from the plurality of low priority interrupt bits, wherein at least two of the entries of the low priority interrupt table is associated with a higher priority interrupt bit of the low priority interrupt bits, and a single one of the entries of the low priority interrupt table is associated with a lower priority interrupt bit of the low priority interrupt bits, wherein each of the entries of the low priority interrupt table comprises an interrupt vector;

fetching one of the interrupt vectors from the low priority interrupt table based on the second address; and branching according to the fetched interrupt vector from the low priority interrupt table.

4. A computer program product for priority encoding and vectoring of interrupts comprising a machine readable media having recorded therein computer readable code for performing the steps of:

reading a plurality of interrupt bits from an interrupt status register, wherein the plurality of interrupt bits comprises at least a high priority interrupt bit and a low priority interrupt bit;

computing an address of one of a plurality of vectors in a table from the interrupt bits, wherein the table includes a first number of the vectors associated with the high priority interrupt bit, and a second number of the vectors associated with the low priority interrupt bit, the first number is greater than the second number and the second number is at least one;

fetching one of the vectors from the table based on the address; and branching according to the fetched vector.

5. A computer program product for priority encoding and vectoring of interrupts comprising a machine readable media having recorded therein computer readable code for performing the steps of:

reading interrupt bits from an interrupt status register, wherein the interrupt bits comprise at least a plurality of high priority interrupt bits and a plurality of low priority interrupt bits;

computing a first address of one of a plurality of vectors in a high priority interrupt table from the plurality of high priority interrupt bits, wherein the high priority interrupt table includes a first number of the vectors of the high priority interrupt table associated with a higher priority interrupt bit of the high priority interrupt bits, and a second number of the vectors of the high priority interrupt table associated with a lower priority interrupt bit of the high priority bits, wherein the first number is greater than the second number and the second number is at least one;

fetching one of the plurality of vectors from the high priority interrupt table based on the first address; and branching according to the fetched vector from the high priority interrupt table.

6. The computer program product of claim 5, wherein the computer readable code further comprises computer readable code for performing the steps of:

computing a second address of one of a plurality of vectors in a low priority interrupt table from the plurality of low priority interrupt bits, wherein the low priority interrupt table includes a third number of the vectors of the low priority interrupt table associated with a higher priority interrupt bit of the low priority interrupt bits, and a fourth number of the vectors of the low priority interrupt table associated with a lower priority interrupt bit of the low priority interrupt bits, wherein the third number is greater than the fourth number;

fetching one of the plurality of vectors from the low priority interrupt table based on the second address; and branching according to the fetched vector from the low priority interrupt table.

7. A computer program product for priority encoding and vectoring of interrupts comprising a machine readable media having recorded therein computer readable code for performing the steps of:

reading interrupt bits from an interrupt status register, wherein the interrupt bits comprise at least a plurality of high priority interrupt bits and a plurality of low priority interrupt bits;

determining if one of the high priority interrupt bits is pending, and if pending:

computing a first address of one of a plurality of vectors in a high priority interrupt table from the plurality of high priority interrupt bits, wherein at least two of the vectors of the high priority interrupt table are associated with a higher priority interrupt bit of the high priority interrupt bits, and a single one of the vectors of the high priority interrupt table is associated with a lower priority interrupt bit of the high priority interrupt bits;

fetching one of the plurality of vectors from the high priority interrupt table based on the first address; and branching according to the fetched vector from the high priority interrupt table;

and if none of the high priority interrupt bits was pending, then:

computing a second address of one of a plurality of vectors in a low priority interrupt table from the plurality of low priority interrupt bits, wherein at least two of the vectors of the low priority interrupt table are associated with a higher priority interrupt bit of the low priority interrupt bits, and a single one of the vectors of the low priority interrupt table is associated with a lower priority interrupt bit of the low priority interrupt bits;

fetching one of the plurality of vectors from the low priority interrupt table based on the second address; and branching according to the fetched vector from the low priority interrupt table.

8. A method for priority determination and vectoring of interrupts comprising:

reading, in a computer, interrupt bits from an interrupt status register, wherein the interrupt bits comprise at least a higher priority interrupt bit and a lower priority interrupt bit;

computing, in the computer, an address of one of a plurality of entries in a table from the interrupt bits, the table encoding interrupt priority with at least two of the entries for the higher priority interrupt bit, and fewer entries for the lower priority interrupt bit, wherein each of the entries comprises an interrupt vector;

fetching, in the computer, one of the interrupt vectors from the table; and branching, in the computer, according to the fetched interrupt vector;

wherein computing the address is performed by using a bit-vector comprising a plurality of the interrupt bits as an index into the table.

9. A method for priority determination and vectoring of interrupts comprising:

reading, in a computer, interrupt bits from an interrupt status register, wherein the interrupt bits comprise at least a plurality of high priority interrupt bits and a plurality of low priority interrupt bits;

determining, in the computer, if one of the high priority interrupt bits is pending, and if pending:

computing a first address of one of a plurality of interrupt vectors in a high priority interrupt table from the plurality of high priority interrupt bits, wherein at least two of the interrupt vectors correspond to a higher priority interrupt bit of the high priority interrupt bits, and a single one of the interrupt vectors corresponds to a lower priority interrupt bit of the high priority interrupt bits;

fetching one of the interrupt vectors from the high priority interrupt table based on the first address; and branching according to the fetched interrupt vector from the high priority interrupt table;

and if none of the high priority interrupt bits was pending, then:

computing a second address of one of a plurality of interrupt vectors in a low priority interrupt table from the plurality of low priority interrupt bits, wherein at least two of the interrupt vectors correspond to a higher priority interrupt bit of the low priority interrupt bits, and a single one of the interrupt vectors corresponds to a lower priority interrupt bit of the low priority interrupt bits;

fetching one of the interrupt vectors from the low priority interrupt table based one the second address; and branching according to the fetched interrupt vector from the low priority interrupt table;

wherein computing the first address is performed by using a first bit-vector comprising at least some of the plurality of high priority interrupt bits as an index into the high priority interrupt table; and wherein computing the second address is performed by using a second bit-vector comprising at least some of the plurality of low priority interrupt bits as an index into the low priority interrupt table.

10. A method for priority encoding and vectoring comprising:

reading, in a computer, interrupt bits from an interrupt status register, wherein the interrupt bits comprise at least a higher priority interrupt bit and a lower priority interrupt bit;

locating, in the computer, one of a plurality of entries in an interrupt table by using at least some of the interrupt bits as an index into the interrupt table, wherein at least two of the entries correspond to the higher priority interrupt bit, and at least one of the entries corresponds to the lower priority interrupt bit, wherein each of the entries in the interrupt table comprises an interrupt vector;

fetching, in the computer, the interrupt vector from the located entry in the interrupt table; and branching, in the computer, according to the fetched interrupt vector;

wherein the at least two entries corresponding to the higher priority interrupt bit comprise more entries than the at least one entry corresponding to the lower priority interrupt bit.

11. The method of claim 8 wherein the step of computing an address is performed without using a priority encoder.

* * * * *

UNITED STATES PATENT AND TRADEMARK OFFICE
CERTIFICATE OF CORRECTION

| | | |
|---|---|---|
| PATENT NO. | : 7,739,438 B2 | Page 1 of 1 |
| APPLICATION NO. | : 10/365364 | |
| DATED | : June 15, 2010 | |
| INVENTOR(S) | : Daniel V. Zilavy | |

It is certified that error appears in the above-identified patent and that said Letters Patent is hereby corrected as shown below:

In column 7, line 22, in Claim 9, delete "one" and insert -- on --, therefor.

Signed and Sealed this

Twelfth Day of October, 2010

David J. Kappos
*Director of the United States Patent and Trademark Office*